D. H. TWAITS.
SELF LUBRICATING BOLT.
APPLICATION FILED DEC. 22, 1913.
1,155,111.
Patented Sept. 28, 1915.
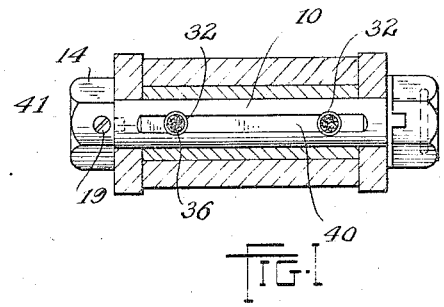
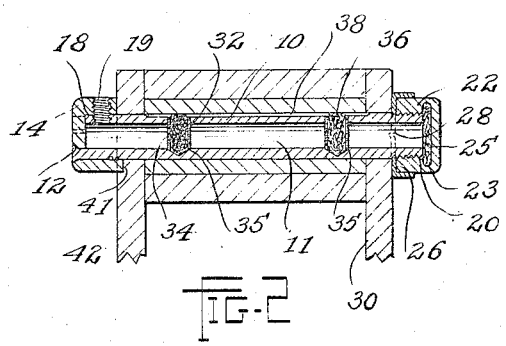
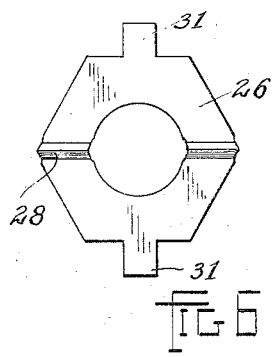
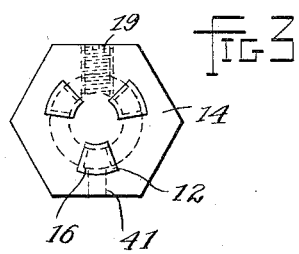
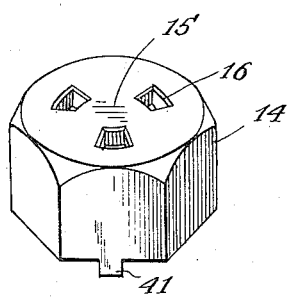
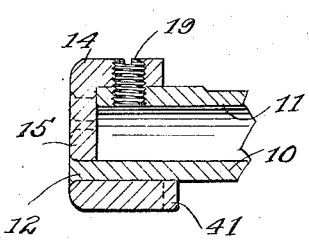
Witnesses
Inventor
Daniel H. Twaits,
By Albert H. Bates,
Atty

UNITED STATES PATENT OFFICE.

DANIEL H. TWAITS, OF CHICAGO, ILLINOIS.

SELF-LUBRICATING BOLT.

1,155,111. Specification of Letters Patent. Patented Sept. 28, 1915.

Application filed December 22, 1913. Serial No. 808,164.

*To all whom it may concern:*

Be it known that I, DANIEL H. TWAITS, a citizen of the United States, residing at Chicago, in the county of Cook and State of Illinois, have invented a certain new and useful Improvement in Self-Lubricating Bolts, of which the following is a full, clear, and exact description, reference being had to the accompanying drawings.

This invention relates to lubricating spring bolts of a type wherein there is a reservoir for the lubricant within the bolt, and the general object is to provide a simple, effective spring bolt which may be cheaply manufactured and which will be strong and durable in service.

More specific objects are to provide simple means to rigidly secure an angular cap on one end of a tubular member, thereby forming the head of the bolt and at the same time tightly close this end of the tubular member and provide a movable cap for tightly closing the other end of the member and at the same time act as a nut to draw the bolt tightly into place.

To the above ends the invention consists in a combination of parts hereinafter described and summarized in the claims.

In the drawings, Figure 1 is a plan of the bolt showing it in position in the eye and shackles of a suitable spring; Fig. 2 is a cross section of the bolt also showing the eye and shackles of the spring; Fig. 3 is an end elevation of the head of the bolt; Fig. 4 is a sectional detail of the same; Fig. 5 is a perspective view of the head before being put in place on the tubular portion or shank of the bolt; Fig. 6 is a detail of a suitable lock washer before being applied.

Referring to the parts by numerals: 10 is a tubular member forming the shank of the bolt having an interior bore 11 which when closed at the ends, forms the reservoir for the lubricant. At the head end of this tubular member are formed projections or lugs 12 preferably made integral with the member 10 and formed by cutting away the portions between these lugs, and leaving the end of the member squared off evenly between them. In making these lugs I find it convenient in removing the metal between them, to cut toward the center, which provides the sides of them being substantially radial, as shown. However, my invention is not limited to the exact shape or number of these lugs, as there may be any convenient number of them of any convenient shape.

The cap 14 forming the head of the bolt has an angular exterior, preferably hexagonal, and is bored out on the inside to fit tightly over the end of the tube. A wall 15 closing the end of the cap, is provided with openings 16 correspondingly positioned and adapted to fit over the lugs 12. At the outer side of the wall 15 these openings are chamfered to allow the ends of the lugs 12 to be upset, causing the metal to engage the cap, without leaving projections or raised portions above the end surface of the cap.

After the cap 14 is forced in place on the end of the tube, and the ends of the lugs 12 have been upset to secure it in place, a hole 18 is made through one side of the cap and through the end of the tube 10 and is threaded on the interior to receive a suitable screw 19 which forms a tight plug for this hole. By removing the screw 19, the reservoir on the interior of the bolt may be filled with suitable lubricant. When this screw is replaced, the lubricant is prevented from leaking out of the hole, at the same time dust and grit is prevented getting into the lubricant.

The opposite end of the tube is provided with external threads 20 on which a threaded cap 22 is screwed when the bolt is in place. At the inner end of the threads of the cap, the bore is undercut at 23, providing a seat for a resilient washer 25 which fits snugly against the end of the tube to prevent leakage of the lubricant. The exterior of this cap is angular, also preferably hexagonal, to allow engagement by a suitable wrench for screwing it onto the tubular member. When this cap is drawn into place, its inner edge, which is squared off to form a shoulder, engages the shackle and draws the bolt into place bringing the cap forming the head of the bolt, against its shackle.

Any suitable lock washer may be provided to securely hold the cap 22 in place. Such a washer is indicated at 26, and is shown, before being used, in Fig. 6. This washer is provided with humps 28 which engage suitable depressions in the shackle 30. After the cap is in place, ears 31 on the lock washer are raised to engage flat sides of the cap and thereby prevent it turning.

To feed the lubricant from the interior of the tube to the bearing surfaces, I provide openings 32 on the top of the bolt and fit into these openings porous sleeves 34. These sleeves, at their lower ends, fit into counterbored seats 35 which securely hold them in their upright position. These sleeves are filled with a suitable wick material 36 which feeds the lubricant by capillary action from the interior of the bolt to the bearing surface 38. In order that the lubricant may reach all points of the bearing surface from end to end thereof, I provide a flattened portion 40 on the top side of the bolt, connecting openings 32 and forming in effect a groove along which the lubricant may flow. It is desirable that the bolt should remain in its upright position to insure the lubricant being fed by capillary action only, which itself supplies sufficient lubricant, while if the bolt should become turned over, it would feed by gravity, which might be too much and allow the lubricant to be wasted. Accordingly, I provide means for holding the bolt in the position with the openings 32 and the plug 19 on the top side. As shown, this means is a lug 41 projecting from the inner end of the cap 14 and engaging a suitable depression in the shackle 42.

It will be seen from the foregoing description that I have provided a spring bolt which may be very cheaply manufactured in that the shank of the bolt is formed of a straight piece of hollow tubing, provided with projections at one end and screw threads on the other. The head of the bolt is formed of a cap having an angular exterior and rigidly secured to one end by the projections, while the nut of the bolt is formed by a cap having an angular exterior and threaded onto the opposite end. This bolt is thoroughly tight, there being no chance for the lubricant to seep through the joints, and it is strong and durable in service.

Having thus described my invention, what I claim is:

1. In a spring bolt, the combination of a tubular member forming a shank of the bolt, a cap fitting over one end of the tubular member, projections carried by the tubular member and engaging the cap for rigidly securing the cap thereto, and means for feeding lubricant to the outer surface of the shank of the bolt.

2. In a spring bolt, the combination of a tubular member forming the shank of the bolt, a cap tightly fitting over one end of the bolt and having a closed end, an opening in the closed end thereof, a projection carried by the tubular member and engaging said openings for securely holding the cap in place, and inlet and outlet passages for said bolt.

3. In a spring bolt, the combination of a tubular member forming the shank of the bolt, a cap fitted tightly over one end of the bolt and having a closed end, an opening in said closed end, a projection carried by the tubular member extending into said opening and being upset at the outer end for rigidly holding the cap in place, and inlet and outlet passages for said bolt.

4. In a spring bolt, the combination of a tubular member forming the shank of the bolt, a cap tightly fitted over one end of the bolt and having an end wall closing the end of tubular member and having openings through said end wall, said opening being chamfered at the outer side of the cap, said tubular member having integral projections at the end thereof engaging said openings and being upset at their outer ends into the chamfered portion of the openings whereby the cap is securely held onto the end of the tubular member, said bolt having inlet and outlet passages for lubricant.

5. In a spring bolt, the combination of a tubular member forming the shank of the bolt, a cap fitted over one end of the tubular member, projections carried by the tubular member and engaging the cap to securely hold the same in place, a lug carried by the cap for engaging the shackle of the spring to prevent the bolt turning when in place, and outlet means leading to the outer surface of the shank.

6. In a spring bolt, the combination of a tubular member forming the shank of the bolt, a cap tightly fitted over one end of said tubular member, a projection on said tubular member engaging the cap to hold the same in place, a passage through the cap and through the end of the tubular member whereby lubricant may be supplied to the interior of the tubular member, a closure for said passage, and outlet means leading to the outer surface of the shank.

7. In a spring bolt, the combination of a tubular member, a cap tightly fitted over the end of said tubular member and having openings in its closed end, projections carried by the tubular member engaging said openings, an opening through one side of the cap and the end of the tubular member, a plug threaded into said opening, and outlet means leading to the outer surface of the shank.

8. In a spring bolt, the combination of a tubular member forming the shank of the bolt, a cap tightly fitted over one end of the tubular member, and having an angular exterior, projections carried by the tubular member and engaging the cap, means for feeding the lubricant from the interior of the tubular member to the exterior thereof, and an opening through the first mentioned cap for supplying lubricant to the interior of the tubular member.

9. In a spring bolt, the combination of a tubular member, a cap tightly fitted over one end and having openings through the end thereof, projections on the tubular member engaging the opening and being upset to hold the cap in place, a passage leading through one side of said cap and through the end of said tubular member, an opening in one side of said tubular member, means for preventing the bolt turning when in position whereby said openings may remain in the desired position, and a cap threaded onto the opposite end of the tubular member, and outlet means leading to the outer surface of the shank.

10. In a spring bolt, the combination of a tubular member, a cap fitted over one end of said tubular member and being secured thereto by projections carried by the tubular member, means for feeding lubricant from the interior of the tubular member to the exterior thereof, a cap threaded on the opposite end of the tubular member and having an enlarged cavity at the inner end of the threads, and a resilient member carried in said cavity and engaging the end of the tubular member when the cap is in position.

11. In a spring bolt, the combination of a tubular member, a cap tightly fitted over and closing one end of the bolt and rigidly secured thereto said cap having an angular exterior and forming the head of the bolt, a cap threaded onto and closing the opposite end of the tubular member said last mentioned cap having an angular exterior and forming the nut of the bolt, and inlet and outlet passages for said bolt.

12. In a spring bolt, the combination of a tubular member, a cap tightly fitted over the end of said tubular member and having openings in its closed end, projections carried by the tubular member and engaging said openings, means for preventing the turning of the bolt when in position, openings through one side of the cap and the end of the tubular member leading to the interior of the bolt, means for closing said opening, and means for leading the lubricant to the outer surface of the bolt.

13. In a spring bolt, the combination of a shank having a cylindrical bore leading from end to end thereof, a cap fitting over and closing one end of the shank, projections carried by one end of the shank and engaging the cap for rigidly securing it thereto, thereby forming the head of the bolt, a cap threaded onto and closing the opposite end of the hollow shank forming the nut of the bolt, and inlet and outlet means for the lubricant.

In testimony whereof, I hereunto affix my signature in the presence of two witnesses.

DANIEL H. TWAITS.

Witnesses:
  ISABEL M. PRENTISS,
  HENRIETTA A. O'DAY.